United States Patent [19]
Cheng

[11] Patent Number: 5,394,254
[45] Date of Patent: Feb. 28, 1995

[54] LIGHT VALVE PROJECTOR ASSEMBLY INCLUDING FIBER OPTIC PLATE WITH FIBER BUNDLE PERIMETER LESS THAN TWICE AS REFLECTIVE AS ELSEWHERE

[75] Inventor: Liang T. Cheng, Portland, Oreg.

[73] Assignee: Greyhawk Systems, Inc., Mountain View, Calif.

[21] Appl. No.: 176,882

[22] Filed: Jan. 3, 1994

Related U.S. Application Data

[63] Continuation of Ser. No. 73,959, Jun. 8, 1993, abandoned, which is a continuation-in-part of Ser. No. 786,562, Nov. 1, 1991, abandoned.

[51] Int. Cl.[6] .................... G02F 1/1335; G02F 1/135
[52] U.S. Cl. ........................ 359/42; 359/40; 359/72
[58] Field of Search .............. 359/42, 40, 41, 72

[56] References Cited

U.S. PATENT DOCUMENTS

| | | | |
|---|---|---|---|
| 4,533,215 | 8/1985 | Trias et al. | 359/72 |
| 4,917,472 | 4/1990 | Margerun et al. | 359/77 |
| 5,144,463 | 9/1992 | Hatano et al. | 359/72 |
| 5,170,271 | 12/1992 | Lackner et al. | 359/72 |
| 5,223,960 | 6/1993 | Kim | 359/72 |

OTHER PUBLICATIONS

Bleha, "Application of the Liquid Crystal Light Valve to Read-Time Optical Data Processing", *Optical Engineering*, vol. 17, No. 4 (Jul.–Aug. 1978), pp. 371–384.

Gates, "Direct Coupled CRT Liquid Crystal Display", *XEROX Disclosure Journal*, vol. 1, No. 6 (Jun. 1976), pp. 77–78.

Ledebuhr, Arno G., "Full-Color Single-Projection-Lens Liquid Crystal Light-Valve Projector", *SID86 Digest* (1986), pp. 379–382.

*Primary Examiner*—Anita Pellman Gross
*Attorney, Agent, or Firm*—Flehr, Hohbach, Test, Albritton & Herbert

[57] ABSTRACT

A liquid crystal light valve projector assembly is disclosed here including (1) a multi dashed layered liquid crystal light valve having a light-writing side and a light projecting side, (2) light-writing means for producing modulated writing light representative of a given image, which writing light when written onto the light-writing side of said light valve causes the latter to modulate in a corresponding manner, and (3) light projecting means cooperating with the light-projecting side of said light valve for projecting a correspondingly modulated projection light beam onto a projection plane for visually displaying the given image. In addition to the components just recited, the liquid crystal light valve projector assembly disclosed here in also includes the fiber optic plate arrangement which is provided for coupling the light-writing means, for example a cathode ray tube, to the light valve and which is specifically designed to eliminate from the ultimately projected image the faint honeycomb pattern known as the "chicken wire effect". This is accomplished by polishing the fiber optic plate surfaces into smooth surfaces in which the reflectance at the outer perimeter of optical fiber bundles within each surface is less than twice the reflectance at any other position within a corresponding optical fiber bundle.

18 Claims, 7 Drawing Sheets

LIGHT VALVE PROJECTOR ASSEMBLY INCLUDING FIBER OPTIC PLATE WITH FIBER BUNDLE PERIMETER LESS THAN TWICE AS REFLECTIVE AS ELSEWHERE

This is a continuation of application Ser. No. 08/073,959, filed Jun. 8, 1993, now abandoned, which is a continuation-in-part of Ser. No. 07/786,562, filed Nov. 1, 1991, now abandoned.

BACKGROUND

1. Field of the Invention

The present invention relates generally to a liquid crystal light valve projector assembly including a liquid crystal light valve, a cathode ray tube (CRT) or other such means for producing modulated writing light representative of a given image which is applied to the light valve, and projection optics responding to the light valve for projecting a correspondingly modulated projection light beam onto a projection plane for visually displaying the given image. The present invention relates more particularly to a fiber optic plate arrangement which is provided for coupling the CRT or other such light-writing means to the light valve and which is specifically designed to eliminate from the projected image a faint honeycomb pattern known as the "chicken wire effect".

2. Summary of the Prior Art

Figure 1:
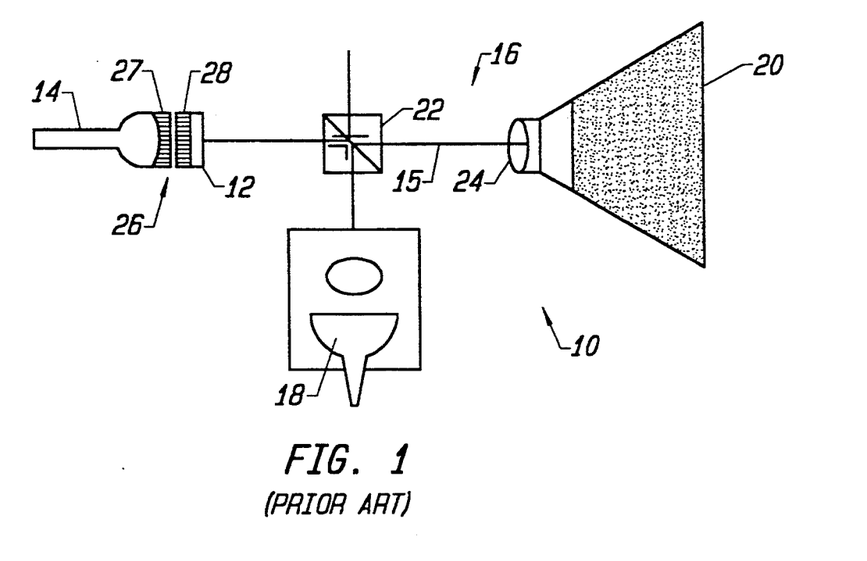
FIG. 1 is a diagrammatic illustration of a liquid crystal light valve projector assembly which is representative of the prior art and which includes the typical prior art fiber optic plate arrangement including opposing upstream and downstream fiber optic face plates.

A typical liquid crystal light valve projector assembly of the prior art is described in an article entitled FULL-COLOR SINGLE-PROJECTION-LENS LIQUID-CRYSTAL LIGHT-VALVE PROJECTOR by Arno G. Ledebuhr, SID 86 DIGEST, pages 379-382. The projector illustrated in this article is reproduced herein as FIG. 1 and is generally designated by the reference numeral 10. Projector 10 is shown including (1) a liquid crystal light valve 12, (2) a cathode ray tube 14 for producing modulated writing light which is representative of a given image and which when written (actually projected) onto light valve 12 causes the latter to modulate a projection light beam 15 in a corresponding manner, and (3) projection optics 16 and a light source 18 for providing the projection light beam 15 and for projecting this correspondingly modulated projection light beam onto a projection screen 20 for visually displaying the given image. As illustrated in FIG. 1, the projection optics includes, among other components, a polarizing (and beam splitting) prism 22 and a projection lens 24.

In addition to these components, projector 10 shown in FIG. 1 includes a fiber optic face plate arrangement 26 for coupling the CRT to the light-writing side of light valve 12. Fiber optic face plate arrangement 26 is shown including two separate and distinct fiber optic face plates 27 and 28 which are themselves optically coupled to one another by means of a suitable index matching fluid, for example oil (not shown). The upstream fiber optic face plate 27 includes a light entering end face which is mounted to and forms part of the screen of CRT 14 and, at the same time, downstream fiber optic face plate 28 includes a light exiting end face mounted to the light-writing side of light valve 12. As seen in FIG. 1, the otherwise free sides of these two fiber optic face plates are in confronting relationship to one another.

Figure 2:
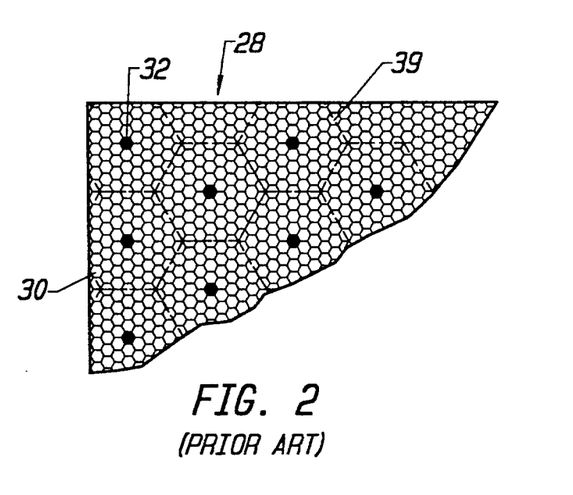
FIG. 2 is an enlarged planar sectional view of a portion of the upstream face plate 27 illustrated in FIG. 1.
Figure 3:
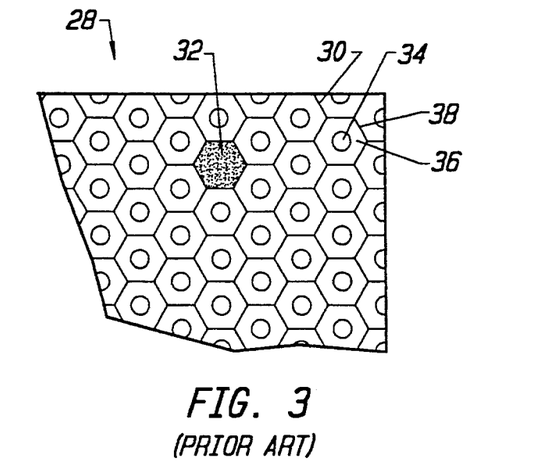
FIG. 3 is a still larger view of the face plate 27 illustrated in FIG. 2.

Having described fiber optic plate arrangement 26 generally, attention is now directed to a more detailed description of each of the fiber optic face plates forming part of this arrangement. In particular, FIGS. 2 and 3 are enlarged and extra enlarged views, respectively, of a section of fiber optic face plate 28. As seen in FIG. 2, this face plate is comprised of an array of lengthwise adjacent optical fibers 30 having opposite end faces lying on opposite sides of the face plate. In addition to these optical fibers 30, the face plate includes a number of light absorbing fibers 32 spaced apart from one another and surrounded by adjacent optical fibers 30, as illustrated in FIG. 2.

As can be seen in FIG. 3, each optical fiber 30 is comprised of a central core 34, a cladding layer 36 surrounding the core, and a layer of flux material 38 which surrounds the cladding layer and which bonds the cladding layer and core to adjacent optical fibers. In a typical embodiment of face plate 28, the cores, cladding, and flux making up optical fibers 30 are formed of glasses of differing hardness and indices of refraction, depending on the particular application. In this same embodiment, the light absorbing fibers 32 are typically formed of statistical extramural absorption material (EMA). It should be noted that of the components recited, the light absorbing fibers 32 are physically the hardest, followed by cores 34, and then cladding layers 36. The flux material 38 is physically the softest component in this group making up the face plate.

Figure 4:
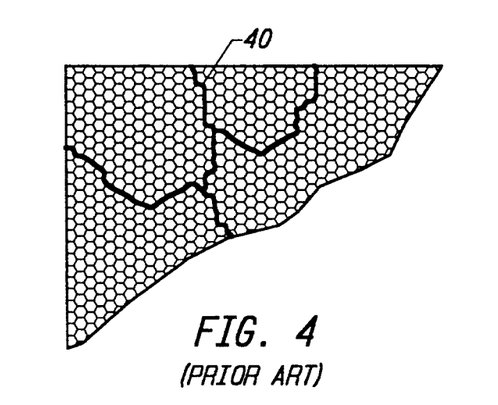
FIG. 4 is a view similar to FIG. 2 but illustrating a slightly modified fiber optic face plate.

Fiber optic face plate 27 optically couples the image appearing on the CRT 14 to face plate 28 which is designed to couple the image onto the write side of light valve 12, as is well known. Particular sub-arrays of optical fibers 30 are responsible for coupling corresponding pixels of the image from the face of the CRT onto the light valve. At the same time, the light absorbing fibers 32 are provided to reduce cross talk between sub-arrays. In a typical face plate, of the total fiber content, there may be approximately 3% light absorbing fibers (statistical EMA) necessary to accomplish this. As an alternative, instead of light absorbing fibers 32, face plate 28 may be provided with extramural absorption (EMA) material in the interstitial areas between groups of optical fibers 30. These EMA boundaries which are illustrated in FIG. 4 at 40 serve the same purpose as light absorbing fibers 32, that is, to reduce cross talk between pixels. In this case, the EMA typically makes up about 1% of the total area of fiber optic face plate 28. Like the light absorption fibers 32, the interstitial EMA material 40 is physically harder than any of the components making up optical fibers 30 and extends from one end face of the face plate to its opposite end face.

While fiber optic face plate 28 forming part of overall fiber optic plate arrangement 26 has been described in detail above, it is to be understood that fiber optic face plate 27 also forming part of this overall prior art arrangement may be substantially identical to face plate 28, that is, it will typically include the same lengthwise adjacent optical fibers and either spaced apart light absorption fibers or interstitial EMA material. Therefore, regarding this discussion of prior art, it is to be understood that any comments relating to face plate 28 are also applicable to face plate 27.

Having described the prior art liquid crystal light valve projector assembly and, in particular, the typical fiber optic face plate arrangement for optically coupling its CRT to its light valve, attention is now directed to a particular problem which has heretofore been associated with this type of optical coupling arrangement.

More specifically, heretofore, optical face plate arrangements have tended to impart onto the projection plane along with the intended image a faint honeycomb pattern which is know as the "chicken wire effect". Actually, what is imparted onto the projection plane is a visually observable regular boundary pattern corresponding to the cross sectional boundary pattern of certain lengthwise adjacent optical fibers or groups of fibers. This visually observable regular boundary pattern or "chicken wire effect" may extend across the entire projection plane or it may appear in one or more sections of the projection planes. This pattern may extend over the entire face plate and more predominantly around the so-called "multi-multi fiber boundary" of fiber bundles. This fiber bundle boundary pattern 39 is shown diagrammatically in FIG. 5A. The same pattern 39 is also shown in FIG. 2. It is obvious that this phenomenon detracts from the intended image. As will be seen hereinafter, it is the object of the present invention to eliminate or substantially eliminate this particular problem.

Figure 5:
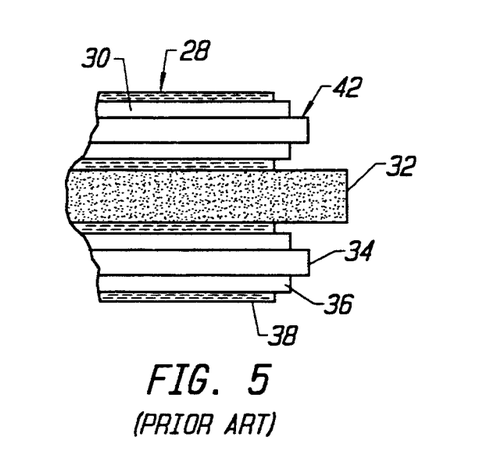
FIGS. 5, 5A, and 5B are diagrammatic illustrations of a segment of the fiber optic face plate illustrated in FIGS. 2 and 3.
Figure 5A:
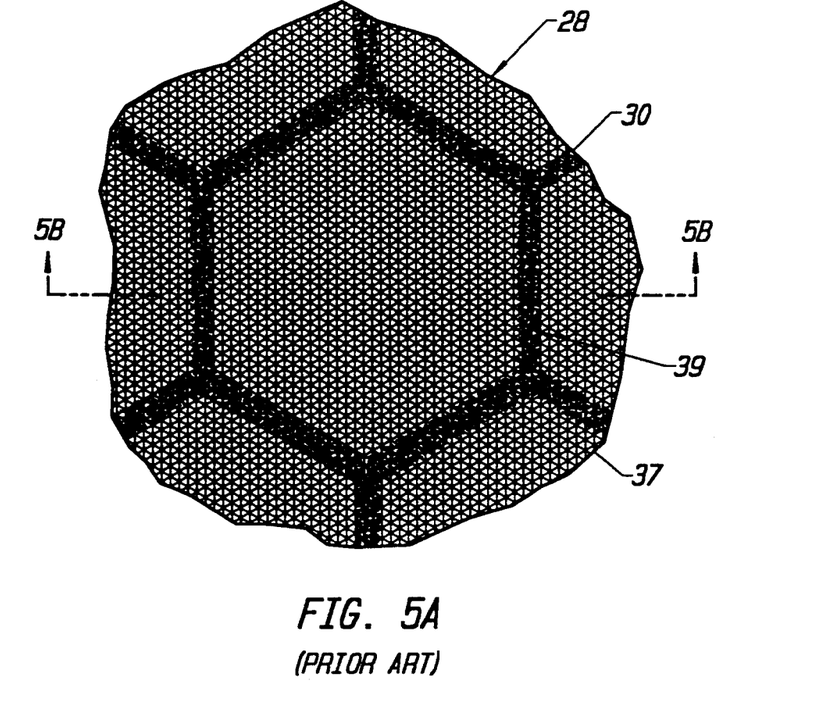
Figure 5B:
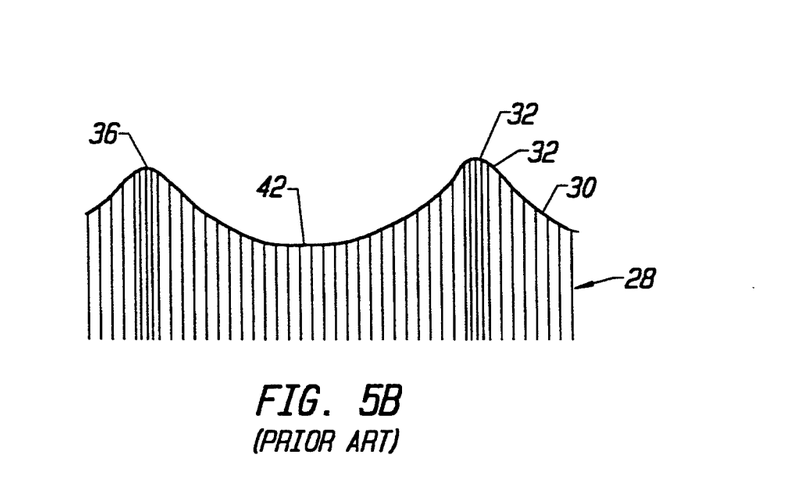

Prior to the present invention, it was not entirely understood why the chicken wire effect resulted from the use of the fiber optic plate arrangement in a liquid crystal light valve projector assembly. One reason given heretofore was that the optical fibers making up the arrangement are not perfect. See specifically U.S. Pat. No. 4,917,472 (column 4, lines 30–40). Applicants have since discovered that the degree to which the chicken wire effect exists is at least in large part dependent upon the degree to which the end faces of the fiber optic face plate making up the overall fiber optic plate arrangement are micro-smooth. This is particularly true for the light entering the end face of fiber optic face plate 27, that is, the end face immediately adjacent CRT 14, and the light exiting end face of fiber optic face plate 28, that is, the end face immediately adjacent light valve 12. A highly exaggerated view of a section of face plate 28 is shown in FIGS. 5 and 5B, particularly depicting a segment of its light exiting end face which is generally indicated at 42. End face 42, like the opposite end face of face plate 28 and the end faces of face plate 27 has been polished in a well-known manner.

Applicant has found that using prior art polishing techniques results in an end face which is not particularly smooth in the micro-sense. More specifically, because of the differences in hardness between the light absorbing fibers 32 (the hardest), optical fiber cores 34 (the next hardest), cladding layers 36, and flux material 38 (the softest), there is the tendency to have an irregular surface pattern, as shown in FIGS. 5 and 5B. FIG. 5 illustrates the irregular pattern around a given light absorbing fiber, whereas FIG. 5B illustrates the overall irregular, actually undulating, pattern that extends over the entire surface 42. As seen there, each of the light absorption fibers 32 (because they are the hardest) project further outward from the end face than any other component while the flux material (because it is the softest) defines the greatest recesses within the surface. As a result of this irregular pattern, the light passing across surface 42 (exiting the surface in this case) tends to be reflected and refracted in a way which results in the chicken wire effect discussed above. This is also true for the other end faces not shown in such detail. As will be seen hereinafter, the present invention has end faces that are sufficiently smooth so as to eliminate or substantially eliminate the chicken wire effect otherwise resulting from these micro irregularities.

SUMMARY OF THE INVENTION

As will be described in more detail hereinafter, a liquid crystal light valve projector assembly of the general type described above in conjunction with FIG. 1 is disclosed herein. This projector assembly includes (1) a multi-layer liquid crystal light valve having a light-writing side and a light-projecting side, (2) light writing means, for example a cathode ray tube, for producing modulated writing light, which writing light when written onto the light-writing side of the light valve causes the latter to modulate in a corresponding manner, and (3) light projecting means, for example a primary projection source and associated optics, cooperating with the light-projecting side of the light valve for projecting a correspondingly modulated projection light beam onto a projection plane for visually displaying the given image. The overall projector assembly also includes means designed in accordance with the present invention for coupling the light-writing means, for example the CRT, to the light-writing side of the light valve for causing the write light to write onto the light-writing side of the light valve in a way which eliminates or substantially eliminates the previously described chicken wire effect. More specifically, the coupling means includes a fiber optic plate arrangement having a light entering end face of lengthwise adjacent optical fibers for receiving write light from the light-writing means and a light exiting end face of lengthwise adjacent optical fibers for directing the write light onto the light-writing side of the valve. In accordance with the present invention and in contrast to the prior art, a fiber optic faceplate without statistical fibers or interstitial EMA is used. Unlike prior art devices which use statistical fibers or interstitial EMA, the face plate of the present invention substantially reduces the difficulty in making face plate surfaces sufficiently smooth so as not to cause the projection light beam to project onto the projection plane any chicken wire patterns, that is, any visually observable regular boundary patterns corresponding to the cross sectional boundary patterns of lengthwise adjacent optical fibers or groups of optical fibers due to the previously described undulating surface. This smooth surface is accomplished by polishing the end faces into surfaces in which the reflectance at every fiber optic bundle boundary is less than twice the reflectance at the center of the region within the boundary.

A preferred embodiment of the projector assembly disclosed herein comprises a fiber optic plate arrangement of the general prior art type described previously and thus includes an upstream fiber optic face plate immediately adjacent its cathode ray tube and a downstream fiber optic face plate immediately adjacent its light valve. However, in this preferred embodiment unlike the prior art, only the upstream fiber optic face plate includes means for preventing cross talk between pixels, that is, either light absorbing fibers 32 or interstitial EMA material 40 are provided. The down-stream fiber optic face plate in this preferred embodiment includes no such means. This absence of the harder light absorbing fibers or interstitial EMA material makes it easier to polish the end faces of the downstream fiber optic face plate so as to provide the desired smoothness. In a less preferred embodiment, neither face plate includes means for preventing cross talk between pixels (e.g. light absorbing EMA fibers or interstitial EMA material), thereby making it easier to polish all of their end faces to the desired smoothness.

BRIEF DESCRIPTION OF THE DRAWINGS

The present invention will be described in more detail hereinafter in conjunction with the drawings, wherein.

DETAILED DESCRIPTION OF THE INVENTION

Figure 6:
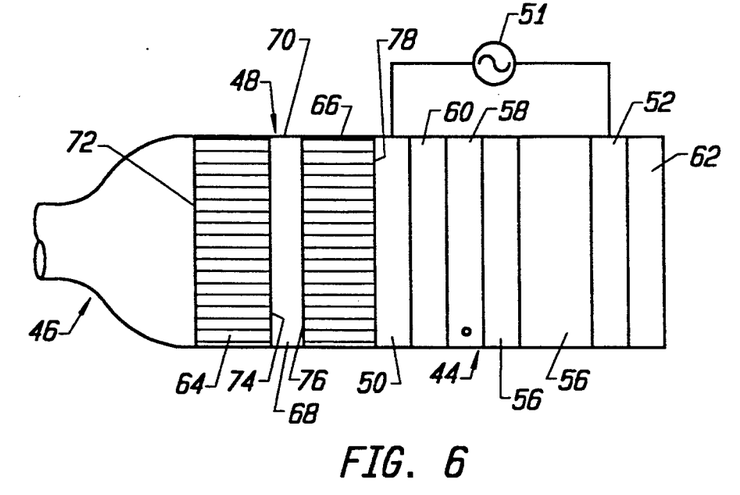
FIG. 6 is a side elevational view, partially in the section, of a liquid crystal light valve projector assembly including a fiber optic plate arrangement designed in accordance with the present invention.
Figure 7:
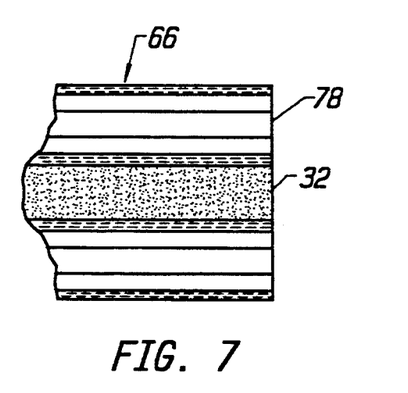
FIG. 7 is an exaggerated diagrammatic illustration of a cross sectional segment of a fiber optic face plate which forms part of the overall arrangement shown in FIG. 6 and which, itself, is designed in accordance with the present invention.
Figure 8:
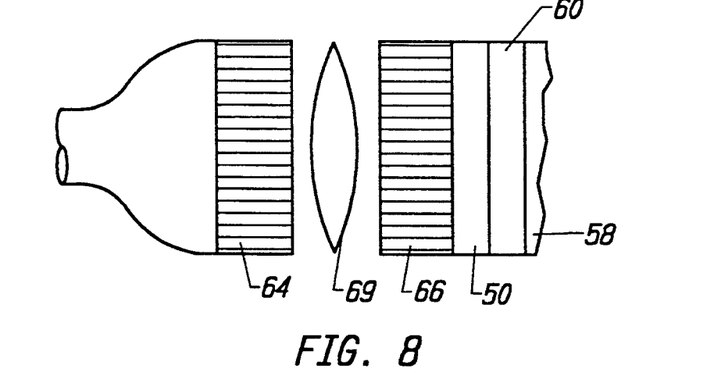
FIG. 8 is a view similar to FIG. 6, illustrating a liquid crystal light valve projector assembly including a modified fiber optic plate arrangement of the present invention.

Having discussed FIGS. 1-5 above, attention is immediately directed to FIG. 6, 7, and 8. FIG. 6 is shown including a multi-layered liquid crystal light valve 44 and a cathode ray tube 46 optically coupled together by means of a fiber optic plate arrangement 48 designed in accordance with the present invention in order to eliminate or substantially eliminate the chicken wire effect described above. The liquid crystal light valve is shown including (1) opposing electrodes 50 and 52 across which an AC drive voltage 51 is connected, (2) a layer of liquid crystal material 54, (3) a light reflecting layer 56, (4) a light blocking layer 58, (5) a photoconductor 60 and, finally, (6) a transparent end face 62. Inasmuch as this light valve is readily provided in the art and does not, by itself, form the present invention, it will not be described any further herein. It is to be understood that the present invention is not limited to this particular light valve design, nor is it limited to the use of a cathode ray tube as the only means for writing onto the light valve through fiber optic plate arrangement 48.

Fiber optic plate arrangement 48 may be identical to previously described fiber optic plate arrangement 26 in many respects. More specifically, arrangement 48 includes an upstream fiber optic face plate 64, a downstream fiber optic face plate 66, and a layer of suitable index matching fluid 68, for example mineral oil or ethylene glycol, contained between the face plates by suitable housing means generally indicated at 70. The face plates 64 and 66 can be optically coupled together by means of a suitable lens or lens arrangement generally indicated as 69 in FIG. 8. In either embodiment, both of face plates 64 and 66 are comprised of lengthwise adjacent optical fibers 30 including core layer 34, cladding layer 36, and flux 38, as described in conjunction with the earlier discussion of fiber optic plate arrangement 26. In addition, upstream fiber optic face plate 64 preferably includes the previously described light absorption fibers 32 or interstitial EMA material 40. In one embodiment of overall fiber optic plate arrangement 48, downstream face plate 66 also includes either light absorbing fibers 32 or interstitial EMA material 40, as in the prior art. In a preferred embodiment of the present invention, downstream face plate 66 includes no such light absorbing fibers or EMA material at all, only the optical fibers 30. In still a third embodiment, neither face plate includes light absorbing fibers or EMA material. In the absence of the light absorbing fibers, it is easier to polish the face plate surfaces, as will be further described below. Prior to the present invention, it was believed that light absorbing fibers were required in all face plates.

Still referring to FIG. 6, upstream fiber optic face plate 64 is shown including a light entering end face 72 through which modulated light from CRT 46 passes and an opposing light exiting end face 74. In a similar manner, downstream fiber optic face plate 66 includes a light entering end face 76 in confronting relationship with end face 74 of face plate 64 and a light exiting end face 78 through which the modulated light finally passes before impinging on light valve 44. Each of these end faces includes the end faces of optical fibers 30 and the end faces of either light absorbing fibers 32 or EMA material 40, where such material is used.

As discussed previously, particularly in conjunction with FIGS. 5, 5A, and 5B, the end faces of fiber optic face plates 27 and 28 of arrangement 26 were described including microstructure irregularities due to the differences in hardness between the various components making up the optical fibers 30 and either the light absorption fibers 32 or EMA material 40 in combination with the way in which the end faces are normally polished. In accordance with the present invention, opposing end faces of each fiber optic face plate 64 and 66 are polished in any conventional way, but to a degree which makes these end faces substantially smoother (less surface irregularities and undulations) than the end faces of face plates 27 and 28. A section of end face 78 of fiber optic face plate 66 is shown in the same enlarged way as the end face 42 of face plate 28 illustrated in FIG. 5 in order to depict the differences in smoothness between the surfaces. While the smoothness of surface 78 may be exaggerated in FIG. 7, as the roughness of surface 42 has been exaggerated in FIG. 5, the point is that the end faces of face plates 64 and 66 are made sufficiently smooth so as not to cause the chicken wire effect described previously. Any suitable means for polishing the end faces of face plate 64 and 66 to achieve this object may be readily provided, as just stated. So long as those individuals skilled in the polishing art are aware of this end goal, they can readily carry out the necessary procedure to achieve the desired end. Accordingly, no particular polishing procedure will be described here.

The same or a similar known polishing process can be used to polish end faces of face plates including EMA material. Moreover, in accordance with the present invention, by eliminating light absorbing fibers and EMA material in fiber optic face plate 66, and for that matter face plate 64, their end faces can be made sufficiently smooth so as to eliminate the chicken wire effect without as rigorous a polishing procedure required where a much harder material is present. In this regard, in a preferred embodiment, applicant has found that neither light absorbing fibers nor EMA material is needed in face plate 66 in order to provide the desired resolution since cross talk is not nearly a critical factor in the downstream face plate as it is in the upstream face plate which is exposed directly against the face of CRT 46. In the case of a face plate which does not include the harder light absorbing fiber or EMA material, the less rigorous polishing procedure may also be readily provided and, hence, will not be discussed herein.

From a fabrication standpoint, the fiber optic face plates 64 and 66 will normally be constructed and their end faces polished at one location. Thereafter, the upstream face plate 64 will typically be incorporated into the CRT by the CRT manufacturer. The remaining fabrication process is usually carried out at the same, final site where the downstream face plate 66 is formed with the light valve 44 and coupled to the CRT by means of the fiber optic face plate arrangement. During these fabrication steps it is important to make sure that the desired smoothness of the opposing end faces of the face plates 64 and 66 is retained. This can be readily carried out so long as the various fabricators are aware of this objective.

In view of the fact that the cladding glass 36 is generally softer than the core glass 34, the cladding glass 36 is more sensitive to chemicals, abrasives, or heat. Using standard polishing procedures for common optical components tends to result in differential etching or polishing with core fibers 34 standing higher than the cladding 36, especially when the boundaries of the core fibers are fused together. This results in the boundaries extending from the surface and thereby forming a concave surface with the core fibers 34 in the center. The recessed perimeter of the concave surface reflects more than the core fibers 34 at the center. Since reflectance is higher, less light is transmitted and the "chicken wire effect" emerges.

To avoid this phenomenon, chemical etching and thermal etching should be avoided. Instead, a mild abrasive, such as neutral HASTILITE PO polishing compound (James H. Rhodes & Co., Hicksville, N.Y.) should be used. The abrasive may be used in conjunction with a polishing rate of approximately 60 rpm.

The polishing should be performed until a polished smoothness is obtained in accordance with the invention. For the purposes of the invention, a polished smoothness is defined as a spatial differential between core fibers 34 and corresponding cladding 36 which is less than 2% of the cell spacing, where the cell spacing is defined as the distance between the inner surfaces of the top and bottom substrates enclosing a liquid crystal material 54. In FIG. 6, liquid crystal material 54 is enclosed by light reflecting layer 56 and electrode 52. A typical cell spacing is 3-10 microns, therefore polishing would proceed until the spatial differential between the bundle (multi-multi) boundary 39 and the area enclosed within the boundary 37 is less than 0.06-0.2 micron.

Figure 9:
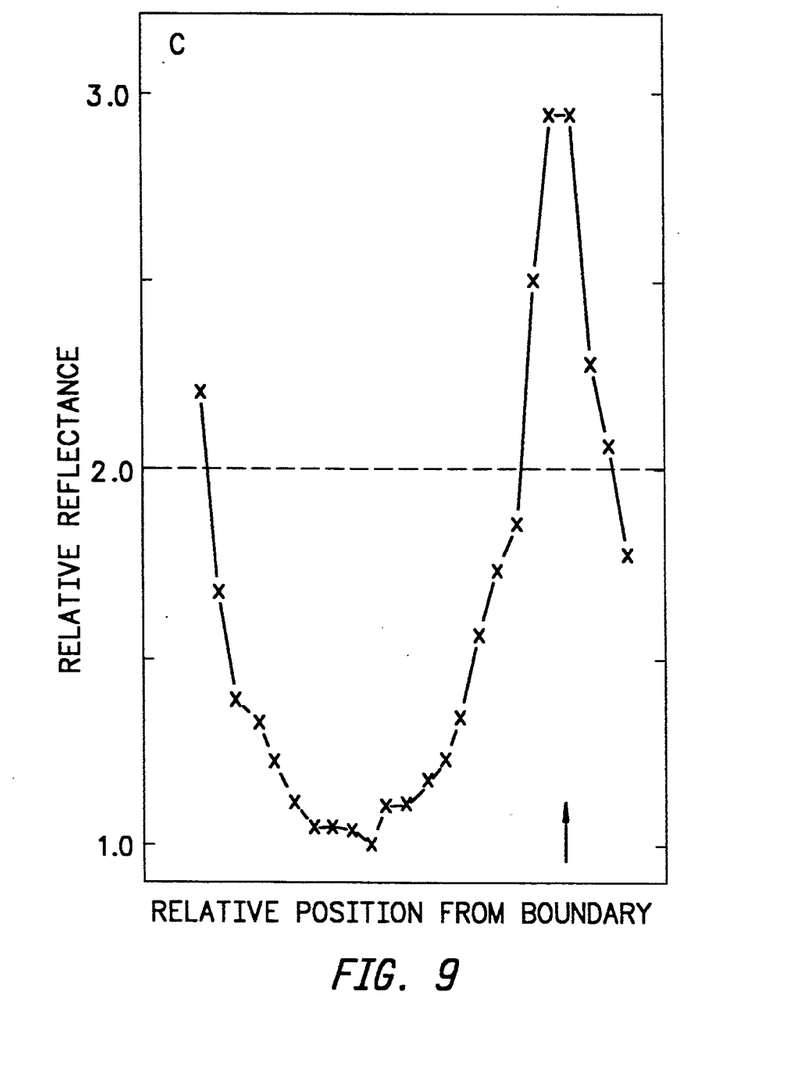
FIG. 9 depicts a plot of relative reflectance as a function of relative position from a fiber optic bundle boundary; in this plot the disparity in relative reflectance is greater than 2, indicating the presence of "chicken wire effect".

In accordance with the invention, a simple technique is provided to verify whether polished smoothness has been obtained. In particular, the faceplate is placed into a polarizing microscope with a black background. For instance, a polarizing microscope may be used (for instance JENAPOL by Jena Co, Germany). FIG. 9 depicts a plot of data which would be obtained from the polarizing microscope. The figure specifically depicts the relative reflectance as a function of the relative position from the perimeter of a multi-multi fiber bundle 39 (as shown in FIG. 5A). Since reflectance is effectively a measure of darkness, FIG. 9 depicts a plot of darkness as a function of position within a fiber bundle. The relative position from the boundary should be viewed as moving from the perimeter 39 of the fiber bundle, which is on the right and marked by an arrow, toward the center of the fiber bundle which is on the left near the marked vertical axis.

FIG. 9 depicts relative reflectance data corresponding to a fiber bundle 39 exhibiting "chicken wire effect". Note that the reflectance of the fiber boundary 39 is more than twice the reflectance in the middle of the fiber bundle 39.

The polarizing microscope can be used to examine a faceplate prior to constructing an entire light valve. Now, in accordance with the invention, the polarizing microscope can be used to determine whether chicken wire effect will be present. If the reflectance of a fiber boundary is more than twice the reflectance at other regions of the fiber, then polishing should continue, as previously described.

Figure 10:
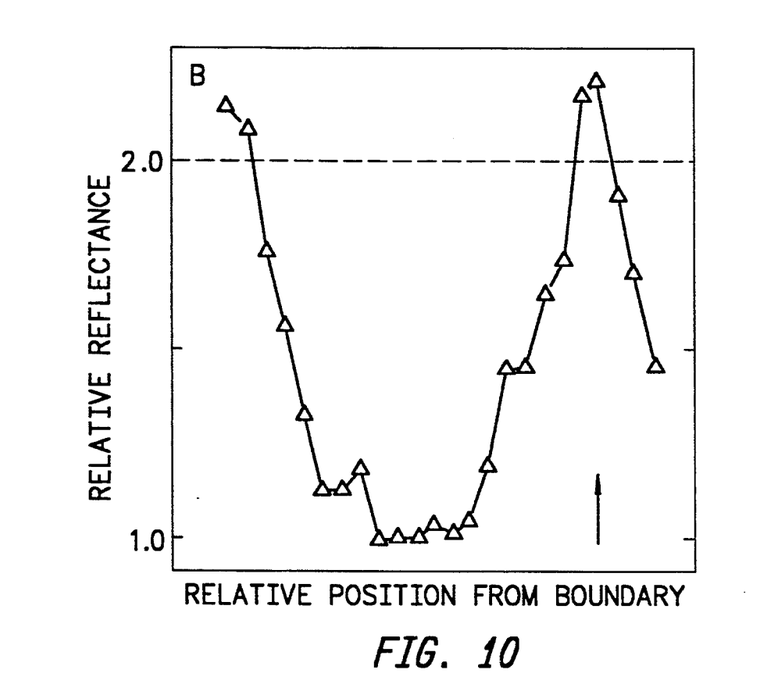
FIG. 10 depicts a plot of relative reflectance as a function of relative position from a fiber optic bundle boundary; in this plot the disparity in relative reflectance is just over 2, indicating a small amount of "chicken wire effect".

FIG. 10 depicts a reflectance plot that characterizes a fiber bundle 39 with faint chicken wire effect. In this case, the range of relative reflectance is slightly greater than 2.

Figure 11:
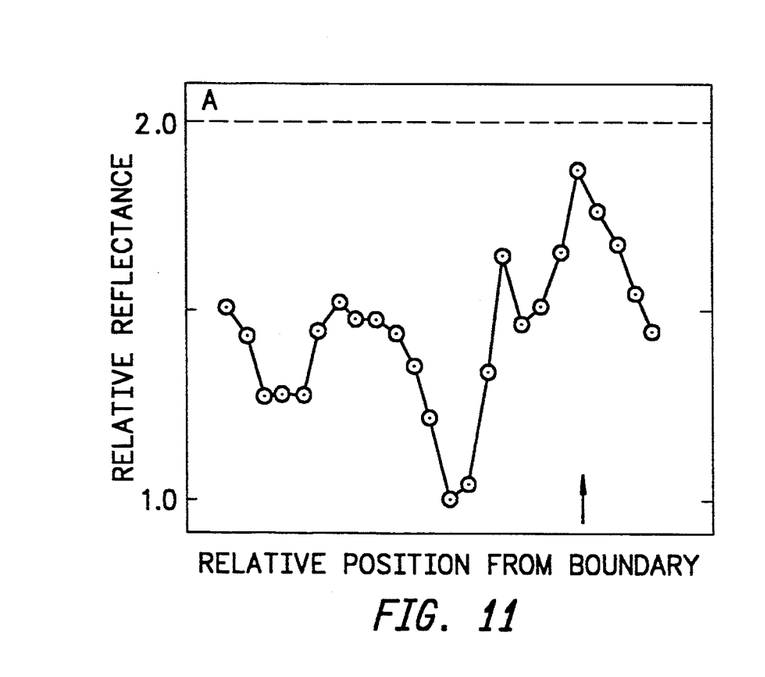
FIG. 11 depicts a plot of relative reflectance as a function of relative position from a fiber optic bundle boundary; in this plot the disparity in relative reflectance is less than 2, indicating no "chicken wire effect".

FIG. 11 depicts a reflectance plot that characterizes a fiber 30 which will not have a chicken wire effect. In this case, the range of relative reflectance is less than 2.0. Thus, in accordance with the invention, it is desirable to perform a polishing operation until the relative reflectance for the fiber is less than 2.0.

What is claimed is:

1. In a liquid crystal light valve projector assembly including a multi-layered liquid crystal light valve having a light-writing side and a light-projecting side, light-writing means for producing modulated writing light representative of a given image, which writing light when written onto the light-writing side of said light valve causes the latter to modulate in a corresponding manner, and light projecting means cooperating with the light-projecting side of said light valve for projecting a correspondingly modulated projection light beam onto a projection plane for visually displaying said given image, the improvement comprising:

means for coupling said light-writing means to the light-writing side of said light valve for causing said write light to write onto said light-writing side, said coupling means including a fiber optic plate arrangement having a light entering end face of lengthwise adjacent optical fibers for receiving write light from said light-writing means and a light exiting end face of lengthwise adjacent optical fibers for directing said write light onto said light-writing side of said valve, said optical fibers being grouped into a plurality of optical fiber bundles, each of said end faces including a smooth surface wherein the reflectance at the outer perimeter of each said optical fiber bundle is less than twice the reflectance at any other position within the corresponding optical fiber bundle, said smooth surface preventing said projection light beam from projecting onto said projection plane any visually observable regular boundary patterns corresponding to said optical fiber bundles.

2. The improvement according to claim 1 wherein said lengthwise adjacent optical fibers include inner cores and outer claddings and are joined together lengthwise by means of a bonding flux, and wherein each of the end faces of said fiber optic plate arrangement includes end faces of said cores, claddings and flux, each of which differs in hardness from the others.

3. The improvement according to claim 2 wherein said fiber optic plate arrangement includes spaced apart light absorbing fibers, disposed lengthwise, adjacent different groups of said optical fibers, and wherein at least the light entering end face of said fiber optic plate arrangement includes end faces of said light absorbing fibers.

4. The improvement according to claim 3 wherein said fiber optic plate arrangement includes a first fiber optic plate including a first group of said optical fibers defining said light entering end face and an opposite end face, a second fiber optic plate including a second group of said optical fibers defining said light exiting end face and an opposite end face in confronting relationship with the opposite end face of said first fiber optic plate, and index matching-means disposed between and optically joining said opposite end faces.

5. The improvement according to claim 4 wherein said opposite end faces of said groups of optical fibers are also sufficiently smooth so as not to cause said projection light beam to project onto said projection plane any visually observable regular boundary patterns corresponding to the cross sectional boundary patterns of said optical fibers or groups of optical fibers.

6. The improvement according to claim 5 wherein said second group of optical fibers does not have any of said light absorbing fibers.

7. The improvement according to claim 2 wherein said fiber optic plate arrangement includes light absorbing material dividing said optical fibers into subgroups of such fibers.

8. In a liquid crystal light valve projector assembly including a multi-layered liquid crystal light valve having a light-writing side and a light-projecting side, light writing means for producing modulated writing light representative of a given image, which light when written onto the light-writing side of said light valve causes the latter to modulate in a corresponding manner, and light projecting means cooperating with the light-projecting side of said light valve for projecting a correspondingly modulated projection light beam onto a projection plane for visually displaying said given image, the improvement comprising:

means for coupling said light-writing means to the light-writing side of said light valve for causing said write light to write onto said light-writing side, said coupling means including a fiber optic plate arrangement which itself includes:

(a) a first fiber optic plate of lengthwise adjacent optical fibers for receiving write light from said light-writing means, said lengthwise adjacent optical fibers being grouped into a plurality of optical fiber bundles;

(b) a second fiber optic plate of lengthwise adjacent optical fibers for directing write light from said first fiber optic plate onto the light-writing side of said valve, said lengthwise adjacent optical fibers being grouped into a plurality of optical fiber bundles;

(c) optical coupling means disposed between and optically joining said first and second fiber optic plates; and (d) each of said first and second fiber optic plates having opposing end faces, each of said end faces including a smooth surface wherein the reflectance at the outer perimeter of said optical fiber bundles is less than twice the reflectance at any other position within a corresponding optical fiber bundle, said smooth surface preventing said modulated writing light from projecting onto said projection plane any visually observable regular boundary patterns corresponding to said optical fiber bundles.

9. The apparatus of claim 8 wherein said optical coupling means includes lens means.

10. The apparatus of claim 8 wherein each of said fiber optic plates is free of any light absorbing fibers or any other such light absorbing material.

11. In a liquid crystal light valve projector assembly including a multi-layered liquid crystal light valve having a light-writing side and a light-projecting side, light writing means for producing modulated writing light representative of a given image that is impinged upon said light-writing side and is projected through said light-projecting side to visually display an image on a projection plane, wherein the light-writing side of the multi-layered liquid crystal light valve forms a portion of a fiber optic plate arrangement having a light entering end face of lengthwise adjacent optical fibers for receiving write light from said light-writing means and a light exiting end face of lengthwise adjacent optical fibers for directing said write light onto the light-writing side of said valve, the method comprising the steps of:

(a) polishing said light exiting end face of said fiber optic plate arrangement to form a polished light exiting end face;

(b) examining said polished light exiting end face with a polarizing microscope to obtain a relative reflectance value corresponding to the reflectance at the outer perimeter of said lengthwise adjacent optical fibers compared to the reflectance at another position within the lengthwise adjacent optical fibers; and (c) repeating steps (a) and (b) until the relative reflectance value is less than two.

12. The method of claim 11 wherein said polishing step includes the step of using a mild abrasive.

13. The method of claim 12 wherein said examining step includes the step of using a black background in conjunction with said polarizing microscope.

14. The method of claim 11 wherein said lengthwise adjacent optical fibers include inner cores and outer claddings and are joined together lengthwise by means of a bonding flux, and wherein each of the end faces of said fiber optic plate arrangement includes end faces of said cores, claddings and flux, each of which differs in hardness from the others.

15. The method of claim 14 wherein said fiber optic plate arrangement includes spaced apart light absorbing fibers disposed lengthwise adjacent different groups of said optical fibers, and wherein only the light entering end face of said fiber optic plate arrangement and not the light exiting face includes end faces of said light absorbing fibers.

16. The method of claim 15 wherein said light absorbing fibers are physically harder than the inner cores and outer claddings of said optical fibers and said bonding flux, whereby a greater effort must be made to adequately polish the light entering end face of said fiber optic plate arrangement than its light exiting end face.

17. The method of claim 14 wherein said fiber optic plate arrangement includes light absorbing material disposed lengthwise around different groups of said optical fibers, and wherein only the light entering end face of said fiber optic plate arrangement and not the light exiting face includes end faces of said light absorbing material.

18. The method of claim 17 wherein said light absorbing material is physically harder than the inner cores and outer claddings of said optical fibers and said bonding flux, whereby a greater effort must be made to adequately polish the light entering end face of said fiber optic plate arrangement than its light exiting end face.

* * * * *